United States Patent [19]
Godwin

[11] Patent Number: 5,357,383
[45] Date of Patent: Oct. 18, 1994

[54] MULTICOMPARTMENT VIDEO TAPE AND PLAYER THEREFOR

[76] Inventor: Joseph K. Godwin, 1517 Bob Lunn Pl., El Paso, Tex. 79935

[21] Appl. No.: 193,478
[22] Filed: Feb. 8, 1994
[51] Int. Cl.$^5$ ............... G11B 15/48; G11B 27/36; G11B 23/02
[52] U.S. Cl. .................. 360/74.3; 360/31; 360/132
[58] Field of Search ............ 360/31, 132, 15, 12, 360/71, 74.1, 74.3; 242/55.19 A, 197

[56] References Cited

U.S. PATENT DOCUMENTS

| 3,281,042 | 8/1964 | Hardison et al. | 242/55.19 A |
| 3,592,535 | 7/1971 | Gerry | 360/105 X |
| 3,608,805 | 9/1971 | Ogata | 226/118 |
| 3,645,539 | 2/1972 | Jenkins | 360/31 X |
| 3,831,190 | 8/1974 | Ward | 360/31 X |
| 3,925,820 | 12/1975 | Esashi | 360/132 |
| 4,020,999 | 5/1977 | Camras | 242/55.19 A |
| 4,462,553 | 7/1984 | Hashimoto | 242/55.19 |
| 5,247,405 | 9/1993 | Mitani | 360/31 X |

Primary Examiner—Andrew L. Sniezek
Attorney, Agent, or Firm—Richard C. Litman

[57] ABSTRACT

A VCR utilizes two rotary heads so as to allow a user to playback a portion of the endless loop magnetic tape while recording onto another portion of the tape. The cassette cartridge is compartmentalized so as to separate that portion of the tape which has just passed by the record head from that portion of the tape which has just passed across the playback head. A middle compartment is used to store any tape rewound from the compartment used to store that tape which has just been played back so as to allow a user to repeat the playback of any portion of the tape inside that compartment.

7 Claims, 1 Drawing Sheet

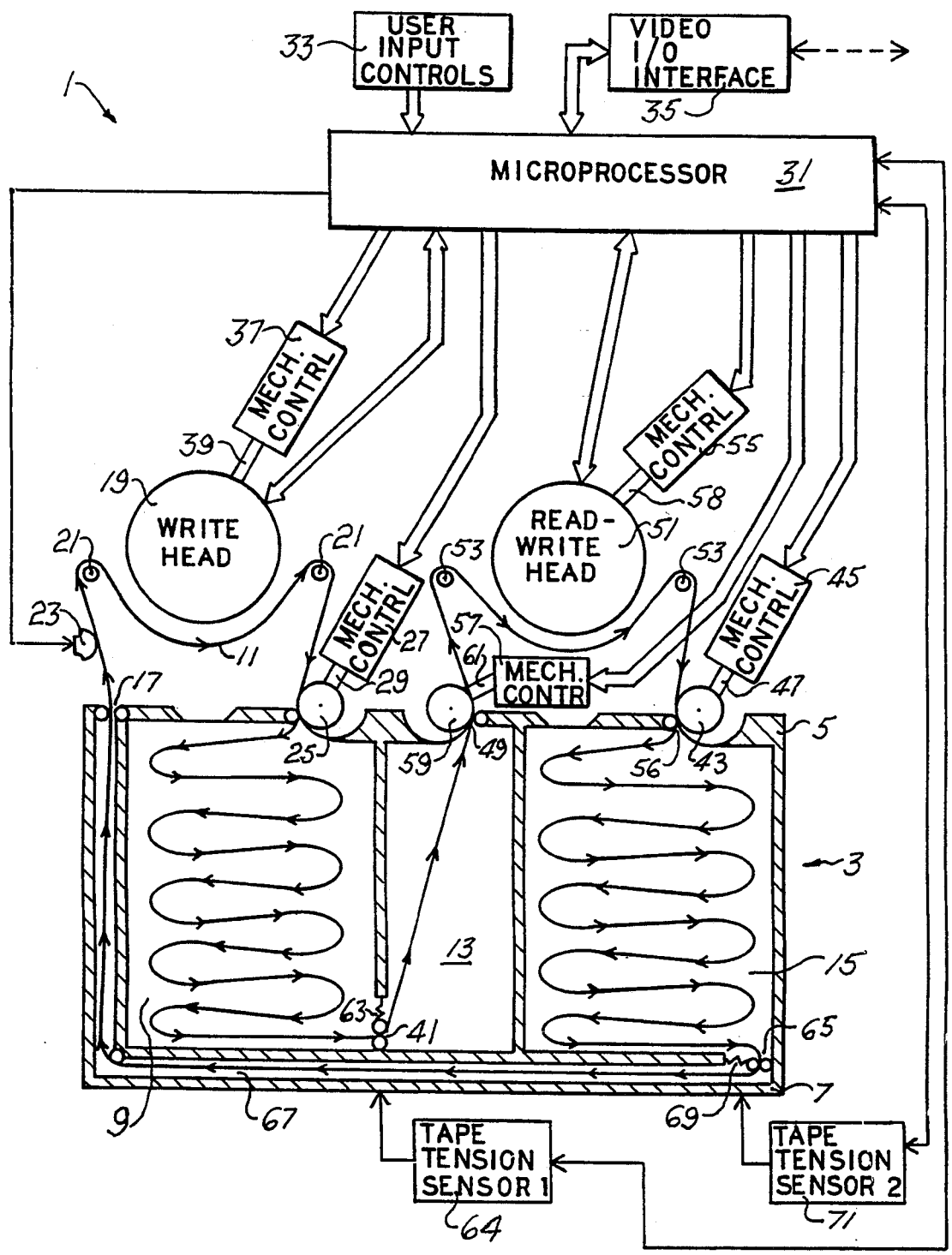

MULTICOMPARTMENT VIDEO TAPE AND PLAYER THEREFOR

BACKGROUND OF THE INVENTION

1. Field of the Invention

The present invention relates to endless loop video tape cartridges and players therefor having a plurality of compartments therein for storing tape. More particularly, the present invention pertains to those video tape cartridges and players therefor for storing tape in a first compartment of the video tape cartridge having newly recorded programming thereon, while storing in last compartment thereof tape which came from the first compartment and has just been played back.

2. Description of the Prior Art

U.S. Pat. No. 3,608,805 issued Sep. 28, 1971 to Osamu Ogata, U.S. Pat. No. 3,281,042 issued Oct. 25, 1966 to John A. Hardison, and U.S. Pat. No. 3,032,287 issued Oct. 29, 1959 disclose endless loop tape cartridges.

U.S. Pat. No. 4,462,553 issued Jul. 31, 1984 to Kazuo Hashimoto discloses, U.S. Pat. No. 4,020,999 issued May 3, 1977 to Marvin Camras, and U.S. Pat. No. 3,925,820 issued Dec. 9, 1975 to Hanjiro Eashi disclose endless loop tape cartridges for storing and reproducing video information.

None of the above inventions and patents, taken either singly or in combination, is seen to describe the instant invention as claimed.

SUMMARY OF THE INVENTION

The present invention relates to a video cassette recorder (VCR) apparatus and cassette cartridge design used therewith for allowing a user to sequentially record an event on video tape and, at the same time, play back recorded portions of that event. A first compartment of the VCR cartridge is used for storing the tape which has just been recorded by a first head of the VCR. The tape is an endless loop tape which enters from the top of the first compartment through an opening therethrough after passing across the first head. A first slit located between the bottom of the first compartment and the bottom of a middle compartment allows the tape to be pulled from the bottom of the first compartment into the middle compartment. During play back of the event, the tape is pulled out of the middle compartment through an opening at the top thereof and is directed across a second head which reproduces the signal recorded by the first head.

That portion of the tape just played back enters a last compartment of the video cassette cartridge through an opening at the top thereof. The tape collects at the bottom of the last compartment as the tape enters the first compartment after being played back. If the user wishes to rewind the tape in order to repeat the play back of a portion of the recorded event, the tape is fed back into the middle compartment through the top opening thereof as it is pulled out of the last compartment through the top opening thereof.

Accordingly, it is a principal object of the invention to provide a video system which can record and play back simultaneously.

It is another object of the invention to provide such a video system which is capable of simultaneously recording an event and playing back that portion of the event which has already been recorded for the purposes of allowing a user to watch the event from its beginning after the recording of the event has started and before it has finished.

It is a further object of the invention to provide separate compartments within a video cassette cartridge of the video system for separately storing tape portions which have been played back, recorded to or rewound.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWING

The drawing is a block diagram of the mechanical and electrical components of the video system of the present invention.

DETAILED DESCRIPTION OF THE PREFERRED EMBODIMENT

A VCR system 1 of the present invention as illustrated in the figure includes a removable video cassette cartridge 3. The video cassette cartridge 3 has a top end 5 and a bottom end 7. The first compartment 9 is used to store a portion of the endless loop tape 11 which has been used to record an event. The endless loop tape 11 passes from the first compartment 9 to a middle compartment 13, then to a last compartment 15, and then back to compartment 9.

During a recording operation, a portion of tape 11 exits a top exit opening 17 and passes across a portion of a first rotary head 19 guided by rollers 21. Rollers 21 are used to extract the tape 11 when the cartridge 3 is initially placed within the VCR of system 1. An erase head 23 is used to erase the tape 11 before reaching the first rotary head 19 so that that portion of the tape 11 is blank before new information is recorded thereon. A driven roller 25 is used to pull the tape 11 across the rollers 21 and the first rotary head 19. The roller 25 pushes the tape 11 into the first compartment 9. The tape 11 drops to the bottom of the compartment 9 and stacks up in a curled fashion as shown in the figure.

The roller 25 is driven by a mechanical controller 27 via a mechanical connection 29 which may be a shaft or belt arrangement, The mechanical control receives instructions from a main controller 31, which in the preferred embodiment includes a microprocessor. Controller 31 receives input commands from the user through user input controls 33 which include the standard commands such as record, play, rewind, start and stop record times, and the like. The particular configuration of the user input controls are varied in the VCR art and does not form a part of the present invention.

The system 1 includes video input/output interface 35 which includes the necessary video processing circuitry to record and playback the input video from some outside connection which in the preferred method of use leads to a TV, another VCR, a cable box, or the like. Interface 35 is controlled by microprocessor 31 so as to enable the first rotary head 19 to record an event input to the interface 35 as the first rotary head 19 is rotated by a mechanical controller 37 via a mechanical connection 39 and under the control of microprocessor 31.

In standard practice, the horizontal sync pulses of a standard NTSC video signal are used to record sync pulses on a sync track of the video tape via a tracking head located on the rotary head after the standard NTSC video signal is processed to be recorded in helical tracks of the video tape. The number of schemes and circuitry used to record and reproduce video information onto and from video tape is varied in the art. The particular recording and reproducing scheme for maintaining tracking and synchronization between the video frames does not form a part of the present invention.

As stated above, during a recording operation, the tape 11 stacks up in the first compartment 9, A tape transfer opening 41 allows the tape to enter the middle compartment 13 from the bottom of the first compartment 9. During a playback operation, a driven pulley 43 driven by a mechanical controller 45 via a mechanical connection 47 under the control of microprocessor 31 pulls a portion of the tape 11 located within the middle compartment 13 through a middle top opening 49. That portion of the tape 11 is driven across a portion of a second rotary head 51 as determined by roller guides 53 used to extract the tape 11 from cartridge 3.

The second rotary head 51 reproduces the recorded signal as that portion of the tape traverses thereacross. A mechanical controller 55 rotates the head 51 via a mechanical connection 57 and under the control of microprocessor 31. The reproduced recorded event is then transferred to the video I/O interface 35 under the control of microprocessor 31 so as to be processed and sent to the user's TV, other VCR, or another user device connected thereto.

During the playback mode of operation, the mechanical controller 45 pushes the tape 11 going across the second rotary head 51 into the last compartment 15 of the video cassette cartridge 3 via a last top opening 55. The tape stacks up in the compartment 15 as illustrated in the figure. If the user wishes to rewind the tape so as to repeat the playback of a particular portion of the recorded event, a mechanical controller 57 drives a pulley 59 via a mechanical connection 61 under the control of the microprocessor 31 so as to pull the tape 11 out of the last compartment 15 via the last top opening across guides 53 and then into the middle top opening 49 so as to stack the tape up in the middle compartment. During the rewind operation, the roller 53 may be lowered so as to allow the tape 11 to disengage the second rotary head 51.

When the proper amount of tape has been rewound as determined by the user, the playback mode of operation is reinitiated. During playback, if all of the slack tape is taken up from the middle compartment, the tape is pulled into the middle compartment from the first compartment through the tape transfer opening 41. If all of the slack tape is taken up from the first compartment, then the tape within both the first and middle compartment is drawn taunt so as to compress a spring 63. The compression of the spring 63 is detected by a first tape tension sensor 64, causing the sensor 64 to send a first stop signal to one of the dedicated ports of the microprocessor 31. The microprocessor stops the mechanical controller 45 from driving the tape 11 into the last compartment 15 in response to the reception of the first stop signal.

When the first tape tension sensor gene rates the first stop signal, the microprocessor knows that most of the tape 11 is located within the last compartment 15. When the user indicates via user input controls 33 that a timed recording operation is to take place by telling the microprocessor 31, which includes a real time clock, the exact time of day to begin and quit recording. The microprocessor causes mechanical controller 45 to quickly rotate the roller 43 so as to "fast forward" the tape into the last compartment until the first stop signal is generated so that a maximum record time is available since a maximum amount of tape is located within the last compartment 15. During the recording operation, the tape exiting the top exit opening is drawn from the bottom of the last compartment 15 through an exit opening 65 and a sectioned off guideway 67.

If during the record operation all of the tape is drawn out of the last compartment 15, during a timed recording operation, a spring 69 is compressed. A second tape tension sensor 71 detects the compression of spring 69 and sends a second stop signal to a dedicated port of the microprocessor 31. This indicates that a maximum amount of tape 11 is stored in the first compartment 9. The microprocessor could generate an alarm signal in response thereto, or place more of the tape 11 in the last compartment 15 after this condition or before this condition by keeping track of the running time, or it may stop the recording operation.

It is to be understood that the present invention is not limited to the sole embodiment described above, but encompasses any and all embodiments within the scope of the following claims,

I claim:

1. A simultaneous record and playback video system comprising:
   a video cassette cartridge having a top end and a bottom end;
   a magnetic tape located within said video cassette cartridge;
   a first compartment of said video cassette cartridge;
   a top exit opening located on said top end of said video cassette cartridge;
   a first top opening leading into said first compartment from said top end of said video cassette cartridge;
   a first rotary head;
   first control means for directing a portion of said magnetic tape exiting said top exit opening around a portion of said first rotary head and then into said first top opening;
   a middle compartment of said video cassette cartridge located adjacent said first compartment thereof;
   a tape transfer opening for allowing tape to exit said first compartment and enter said middle compartment;
   a middle top opening leading from said top end of video cassette cartridge into said middle compartment;
   a last compartment of said video cassette cartridge located adjacent said middle compartment;
   a last top opening leading from said top end of said video cassette cartridge into said last compartment;
   a second rotary head; and
   a second control means for directing a portion of said magnetic tape within said middle compartment out through said middle top opening around a portion of said second rotary head and then into said last top opening.

2. A simultaneous record and playback video system as claimed in claim 1, further comprising rewind control means for allowing a user to initiate a rewind operation thereby directing that portion of the magnetic tape traversing across said portion of said second rotary head under the control of said second control means in an opposite direction thereof, such that said portion of said magnetic tape is directed through said last top opening coming out of said last compartment across said portion of said second rotary head and then into said middle compartment by way of said middle top opening.

3. A simultaneous record and playback video system as claimed in claim 1, further comprising:
a last compartment exit opening located at a bottom end of said last compartment for allowing magnetic tape located therein to exit therefrom; and
guide means for directing a portion of said magnetic tape exiting said last compartment exit opening into said first top exit opening.

4. A simultaneous record and playback video system as claimed in claim 3, further comprising:
a first tape tension sensor located at said tape transfer opening for detecting a minimum amount of tape within said first compartment and producing a first stop signal in response thereto; and
second control canceling means responsive to said first stop signal for inhibiting said second control means from directing said portion of said magnetic tape within said middle compartment out through said middle top opening.

5. A simultaneous record and playback video system as claimed in claim 4, further comprising:
a second tension sensor located at said last compartment exit opening for detecting a minimum amount of tape within said last compartment and producing a second stop signal in response thereto: and
first control canceling means responsive to said second stop signal for inhibiting said first control means from directing said portion of said magnetic tape from exiting said top exit opening.

6. A simultaneous record and playback video system as claimed in claim 1, further comprising an erase head for erasing said portion of said magnetic tape exiting said top exit opening under the control of said first control means before reaching said first rotary head.

7. A simultaneous record and playback video system comprising:
a video cassette cartridge having a top end and a bottom end;
a magnetic tape located within said video cassette cartridge;
a first compartment of said video cassette cartridge;
a top exit opening located on said top end of said video cassette cartridge;
a first top opening leading into said first compartment from said top end of said video cassette cartridge;
a first rotary head;
first control means for directing a portion of said magnetic tape exiting said top exit opening around a portion of said first rotary head and then into said first top opening;
a middle compartment of said video cassette cartridge located adjacent said first compartment thereof;
a tape transfer opening for allowing tape to exit said first compartment and enter said middle compartment;
a middle top opening leading from said top end of video cassette cartridge into said middle compartment;
a last compartment of said video cassette cartridge located adjacent said middle compartment;
a last top opening leading from said top end of said video cassette cartridge into said last compartment;
a second rotary head;
an erase head for erasing said portion of said magnetic tape exiting said top exit opening under the control of said first control means before reaching said first rotary head;
a last compartment exit opening located at a bottom end of said last compartment for allowing magnetic tape located therein to exit therefrom;
guide means for directing a portion of said magnetic tape exiting said last compartment exit opening into said first top exit opening;
a second control means for directing a portion of said magnetic tape within said middle compartment out through said middle top opening around a portion of said second rotary head and then into said last top opening;
rewind control means for allowing a user to initiate a rewind operation thereby directing that portion of the magnetic tape traversing across said portion of said second rotary head under the control of said second control means in an opposite direction thereof, such that said portion of said magnetic tape is directed through said last top opening coming out of said last compartment across said portion of said second rotary head and then into said middle compartment by way of said middle top opening:
a first tape tension sensor located at said tape transfer opening for detecting a minimum amount of tape within said first compartment and producing a first stop signal in response thereto;
second control canceling means responsive to said first stop signal for inhibiting said second control means from directing said portion of said magnetic tape within said middle compartment out through said middle top opening;
a second tension sensor located at said last compartment exit opening for detecting a minimum amount of tape within said last compartment and producing a second stop signal in response thereto; and
first control canceling means responsive to said second stop signal for inhibiting said first control means from directing said portion of said magnetic tape from exiting said top exit opening.

* * * * *